United States Patent [19]

Tanaka et al.

[11] Patent Number: 4,639,800
[45] Date of Patent: Jan. 27, 1987

[54] TAPE RECORDER

[75] Inventors: Shinsaku Tanaka, Tokyo; Toshio Yoshimura, Kawasaki, both of Japan

[73] Assignee: Tanashin Denki Co., Ltd., Tokyo, Japan

[21] Appl. No.: 669,265

[22] Filed: Nov. 7, 1984

[30] Foreign Application Priority Data

Nov. 23, 1983 [JP] Japan ................... 58-220289
Dec. 27, 1983 [JP] Japan ................... 58-246411

[51] Int. Cl.⁴ .............................................. G11B 15/00
[52] U.S. Cl. ...................................... 360/90; 360/96.2
[58] Field of Search ............... 360/96.2, 96.1, 96.3, 360/96.4, 90, 93

[56] References Cited

U.S. PATENT DOCUMENTS

| | | | |
|---|---|---|---|
| 4,291,348 | 9/1981 | Pera | 360/96.2 |
| 4,464,695 | 8/1984 | Kommoss et al. | 360/90 |
| 4,471,398 | 9/1984 | Kommoss et al. | 360/90 |
| 4,503,476 | 3/1985 | Kommoss et al. | 360/90 |
| 4,504,877 | 3/1985 | Tsuchiya | 360/96.2 |

FOREIGN PATENT DOCUMENTS

EP-47552 3/1982 European Pat. Off. ........... 360/96.2
2075244 11/1981 United Kingdom ............... 360/96.2

Primary Examiner—John H. Wolff
Assistant Examiner—Matthew J. Bussan
Attorney, Agent, or Firm—Frishauf, Holtz, Goodman & Woodward

[57] ABSTRACT

First and second operating members can reciprocate in parallel to each other. When the first operating member moves one reel shaft rotates at high speed in the tape-winding direction. When the second operating member moves the other reel shaft rotates at high speed in the tape-winding direction. A tape-direction-changing piece can reciprocate in parallel to the first and second operating members, and can also rotate. When the first or second operating member moves, the tape-direction-changing piece rocks to allow the movement of the first or second operating member. When both the first and second operating members move at the same time, the tape-direction-changing piece moves together with the two operating members to press an operating force-transmitting member, prevented from rocking, thereby actuating a tape-feed-direction-changing mechanism.

3 Claims, 21 Drawing Figures

TAPE RECORDER

BACKGROUND OF THE INVENTION

The present invention relates to an improved tape recorder capable of a recording or reproducing operation irrespective of the feed direction of magnetic tape.

In searching the tape in response to, e.g., a specific request for music, in tape recorders of this type, it is desired that the tape be quickly fed in either direction by a means for changing the tape feed direction.

In this case, the fast-feeding operation requires two operating members for two tape-feed directions, as well as the means for changing the tape-feed direction.

Accordingly, an operating unit used in these prior art tape recorders is complicated in construction, resulting in increased size and delicate assembling work.

SUMMARY OF THE INVENTION

The present invention has been contrived in consideration of these circumstances and is intended to provide a tape recorder capable of a recording or reproducing operation, irrespective of the feed direction of a magnetic tape, miniaturization, and easy assembly. In the present invention, the tape can be quickly fed in either direction, and the tape-feed direction can be changed by a simple mechanism.

In order to achieve the above object, a tape recorder, according to the present invention, comprises capstans, pinch rollers, reel shafts on either side of a magnetic head, and a tape-feed direction-changing mechanism for mechanically changing the feed direction of a magnetic tape. The recording or reproducing operation is permitted when the magnetic tape is fed in either direction. The present invention is characterized by further comprising: first and second operating members capable of reciprocating in parallel to each other, a tape-speed-changing mechanism adapted to rotate one of the reel shafts at a high speed in the tape-winding direction as the first operating member moves and to rotate the other reel shaft at a high speed in the tape-winding direction as the second operating member moves, and a tape-direction-changing piece capable of rotating and of reciprocating in parallel to the first and second operating members. The tape-direction-changing piece is adapted to rock, pressed by one of the operating members, when the one operating member moves and to move together with the operating members in the same direction to start the tape-feed-direction-changing mechanism, prevented from rotating in either direction by both of the operating members, when the two operating members move at the same time, thereby changing the feed direction of the magnetic tape.

BRIEF DESCRIPTION OF THE DRAWINGS

FIGS. 1 to 21 show a tape recorder according to an embodiment of the present invention, in which:

FIG. 1 is a schematic plan view showing an internal mechanism of the tape recorder;

FIG. 2 is a sectional view showing the manner of mounting operating members;

FIG. 3 is a perspective view of a first operating member;

FIG. 4 is a perspective view of a second operating member;

FIGS. 5 to 8 are plan views showing the relationships between the positions of the first and second operating members and a tape direction changing piece;

FIG. 9 is a perspective view showing the relative positions of an operating force-transmitting member and a tape-speed-changing lever;

FIG. 10 is a schematic plan view showing a tape-feed-direction-changing mechanism and its surroundings;

FIG. 11 is a schematic plan view showing a rotation transmission path;

FIG. 12 is a vertical sectional view of a reel shaft;

FIG. 13 is a plan view showing rotation detecting members and other mechanisms associated therewith;

FIG. 14 is a vertical sectional view showing a changing gear and its surroundings;

FIG. 15 is a plan view showing a swinging plate and its surroundings;

FIG. 16 is a plan view showing a changing gear and other mechanisms associated therewith;

FIGS. 17 and 18 are plan views showing a supply-side-detecting-member retaining plate and other mechanisms associated therewith; and FIGS. 19 to 21 are plan views showing a mechanism for driving a head mounting plate.

DETAILED DESCRIPTION OF THE PREFERRED EMBODIMENT

Figure 1:
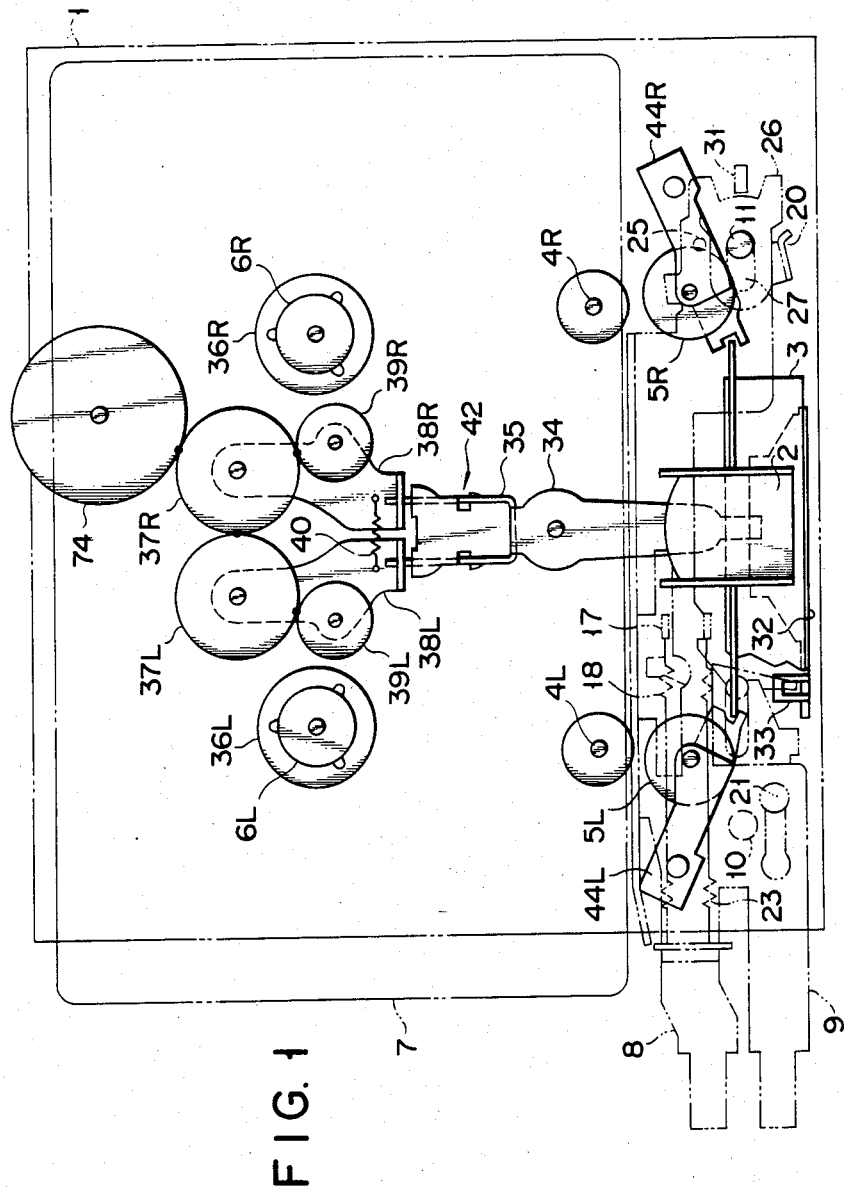

In FIG. 1, numeral 1 designates a chassis of a tape recorder. A magnetic head 2 is mounted on the tape recorder chassis 1 by means of a movable head-mounting plate 3. Capstans 4L and 4R, pinch rollers 5L and 5R, and reel shafts 6L and 6R are arranged on the left- and right-hand sides of the magnetic head 2, respectively. In operation, a tape cassette 7 is set on the reel shafts 6L and 6R, and one of the reel shafts 6L and 6R is rotated in its tape-winding direction. In this state, if the pinch roller 5L or 5R on the same side with the rotated reel shaft 6L or 6R is pressed against its corresponding capstan 4L or 4R to rotate the same, the tape recorder can perform a recording or reproducing operation.

First and second lever-like operating members 8 and 9 are arranged in layers over the magnetic head 2 so they can move in the direction perpendicular to the reciprocating direction of the head mounting plate 3.

Figure 2:
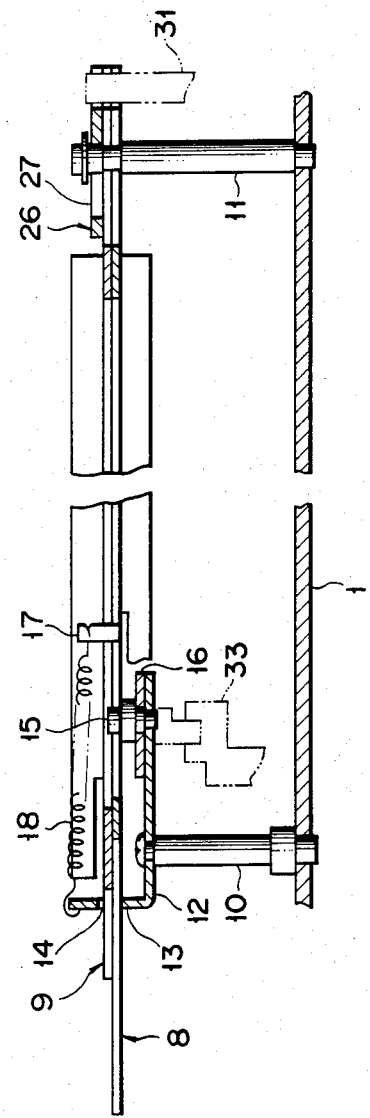
Figure 3:
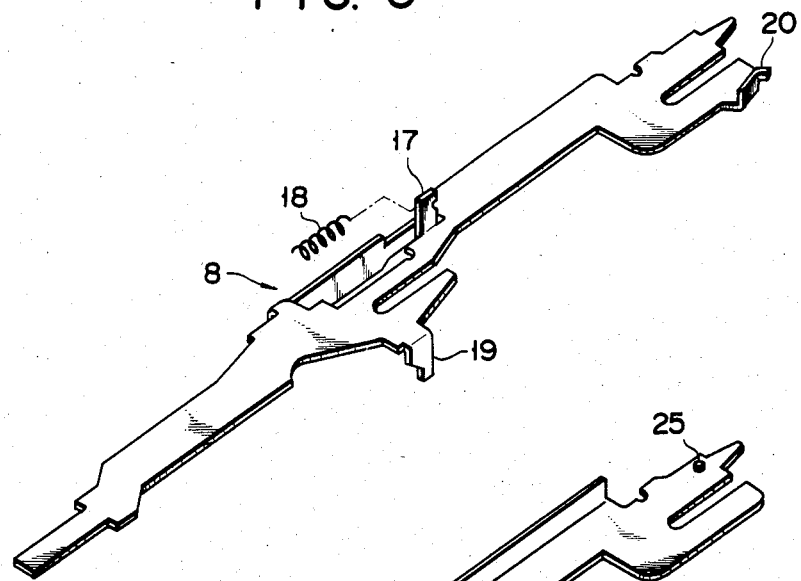

FIG. 2 shows the way the operating members 8 and 9 are mounted on the tape recorder chassis 1. In FIG. 2, numerals 10 and 11 designate operating member-mounting studs erected on the tape recorder chassis 1. A guide plate 12 is fixed to the upper end of the one stud 10 extending parallel to the chassis 1. The guide plate 12 is upwardly bent at one end portion thereof, forming a bent portion 13. A guide hole 14 is bored through the bent portion 13. A speed changing piece 16 is pivotally supported on the central portion of the other end portion of the guide plate 12 by a shaft 15. One end portion of the first operating member 8 is inserted in the guide hole 14, the other end portion is guided by the other stud 11, and the central portion is guided by the shaft 15 for reciprocation. The first operating member 8 has a spring-bearing piece 17 at the central portion, and a tension spring 18 is stretched between the spring-bearing piece 17 and the bent portion 13. Thus, the first operating member 8 is continually urged toward the one end portion by the tension spring 18. As shown in FIG. 3, the first operating member 8 has a speed-changing, piece-pressing portion 19 bent downward at the central portion and a directionchanging, piece-pressing portion 20 bent upward at the other end portion.

Figure 4:
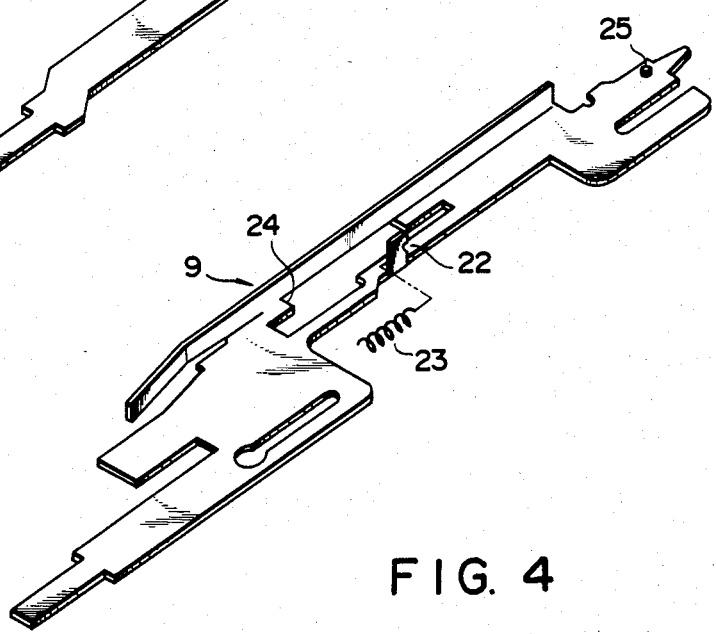

The second operating member 9 is laid on the top of the first operating member 8. One end portion of the second operating member 9 is inserted in the guide hole 14, the other end portion is guided by the upper end of the other stud 11, and the central portion is guided by a small stud 21 erected on the guide plate 12. Thus, the second operating member 9 is allowed to advance and retreat. The second operating member 9 also has a spring-bearing piece 22 at the central portion, and a tension spring 23 is stretched between the spring-bearing piece 22 and the bent portion 13. Thus, the second operating member 9 is continually urged toward the one end portion by the tension spring 23. As shown in FIG. 4, a speed-changing, piece-pressing portion 24 is formed on one end edge of an opening in the central portion of the second operating member 9, and a direction-changing, piece-pressing portion 25 protrudes from the upper surface of the other end portion of the second operating member 9.

Figure 5:
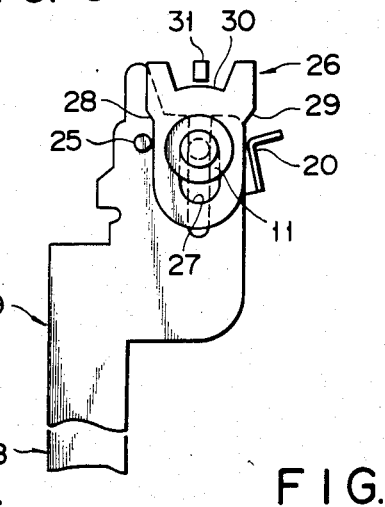
Figure 6:
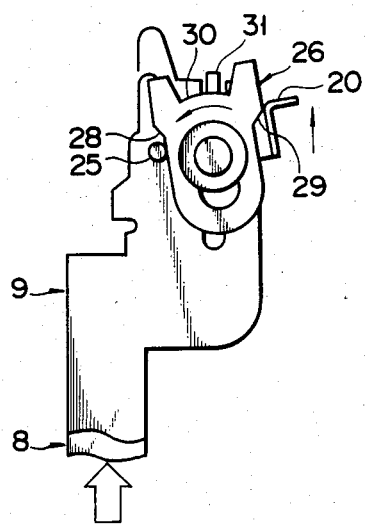
Figure 7:
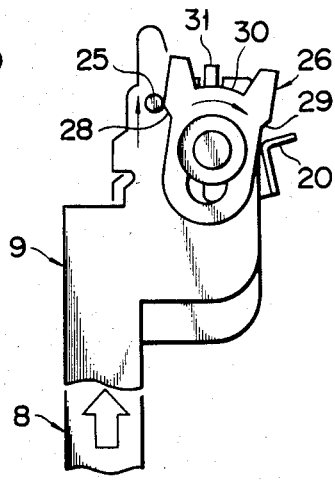

A tape-direction-changing piece 26 is mounted on the upper end of the other stud 11 so as to overlie the second operating member 9. The tape-direction-changing piece 26 has a slot 27, which extends along the reciprocating direction of the operating members 8 and 9. Thus, with the stud 11 fitted in the slot 27, the tape-direction-changing piece 26 can move parallel to the operating members 8 and 9, and can also rock around the stud 11. As shown in FIG. 5, the tape-direction-changing piece 26 has slanting side edges 28 and 29, which are located ahead of the direction-changing, piece-pressing portions 25 and 20 of the operating members 9 and 8, respectively. An arcuate surface 30 having its center of curvature on the front end portion of the slot 27 is formed at the front end of the tape-direction-changing piece 26. One end of an operating force transmitting member 31 is disposed close to the arcuate surface 30. If the first operating member 8 is advanced against the urging force of the tension spring 18, its direction changing piece pressing portion 20 presses the right-hand slanting edge 29 of the tape-direction-changing piece 26 to rock the same to the left, as shown in FIG. 6. If the second operating member 9 is advanced against the urging force of the tension spring 23, its direction-changing, piece-pressing portion 25 presses the left-hand edge 28 of the tape-direction-changing piece 26 to rock the same to the right, as shown in FIG. 7. If both the first and second operating members 8 and 9 are simultaneously advanced against the urging force of the tension springs 18 and 23, then their respective direction-changing, piece-pressing portions 20 and 25 press the slanting edges 28 and 29 at the same time so that the tape-direction-changing piece 26 is allowed to rock in neither direction. Thereupon, the tape-direction-changing piece 26 is designed so that it moves together with the two operating members 8 and 9 to press and move the operating force-transmitting member 31 by its arcuate surface 30.

Figure 9:
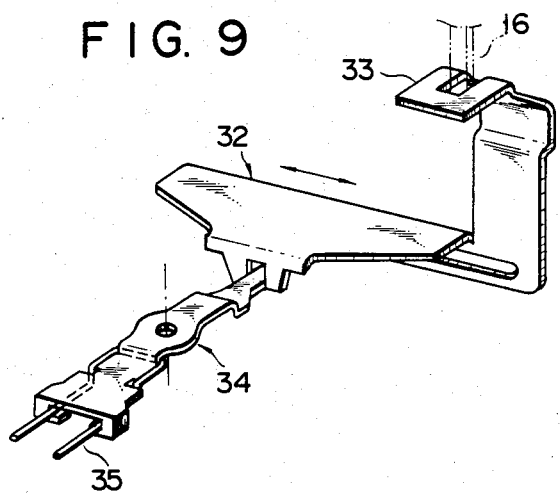

A reciprocative sliding member 32 is mounted beside the head-mounting plate 3 on the tape recorder chassis 1 so that it can reciprocate in parallel to the operating members 8 and 9. As shown in FIG. 9, the reciprocative sliding member 32 has an extending portion 33, which extends to the upper surface side of the chassis 1 and engages one end of the speed-changing piece 16. On the lower surface side of the tape recorder chassis 1, one end of a tape-speed-changing lever 34 engages part of the reciprocative sliding member 32. The tape-speed-changing lever 34 is rockably mounted at its central portion on the lower surface of the tape recorder chassis 1. A bar spring 35 is attached to the other end side of the tape-speed-changing lever 34.

As shown in FIG. 1, reel shaft gears 36L and 36R are mounted on the proximal end portions of the reel shafts 6L and 6R, respectively. Transmission gears 37L and 37R are bisymmetrically arranged in mesh with each other between the gears 36L and 36R. The transmission gears 37L and 37R are rotated by a motor 41 (see FIG. 10).

Idler arms 38L and 38R are rockably mounted at one end on the shafts of the transmission gears 37L and 37R, respectively. Idler gears 39L and 39R are mounted on the arms 38L and 38R so as to be in mesh with the transmission gears 37L and 37R, respectively. The other ends of the idler arms 38L and 38R are located close to the tape-speed-changing lever 34, engaging their corresponding end portions of the bar spring 35. The two idler arms 38L and 38R are urged to rock toward each other by a tension spring 40. The rocking motion of the idler arms 38L and 38R in this direction is restricted by a stopper (not shown). As the idler arms 38L and 38R rock against the urging force of the tension spring 40, both the idler gears 39L and 39R engage their corresponding reel shaft gears 36L and 36R, and transmit the rotatory force of the transmission gears 37L and 37R or the driving force of the motor 41 to the reel shafts 6L and 6R. The reciprocative sliding member 32, the tape-speed-changing lever 34, and the gears 36L, 36R, 39L and 39R constitute a tape-speed-changing mechanism 42.

The tape-recorder chassis 1 is provided with a tape-feed-direction-changing mechanism 43, which is actuated when the operating force transmitting member 31 is operated.

Figure 10:
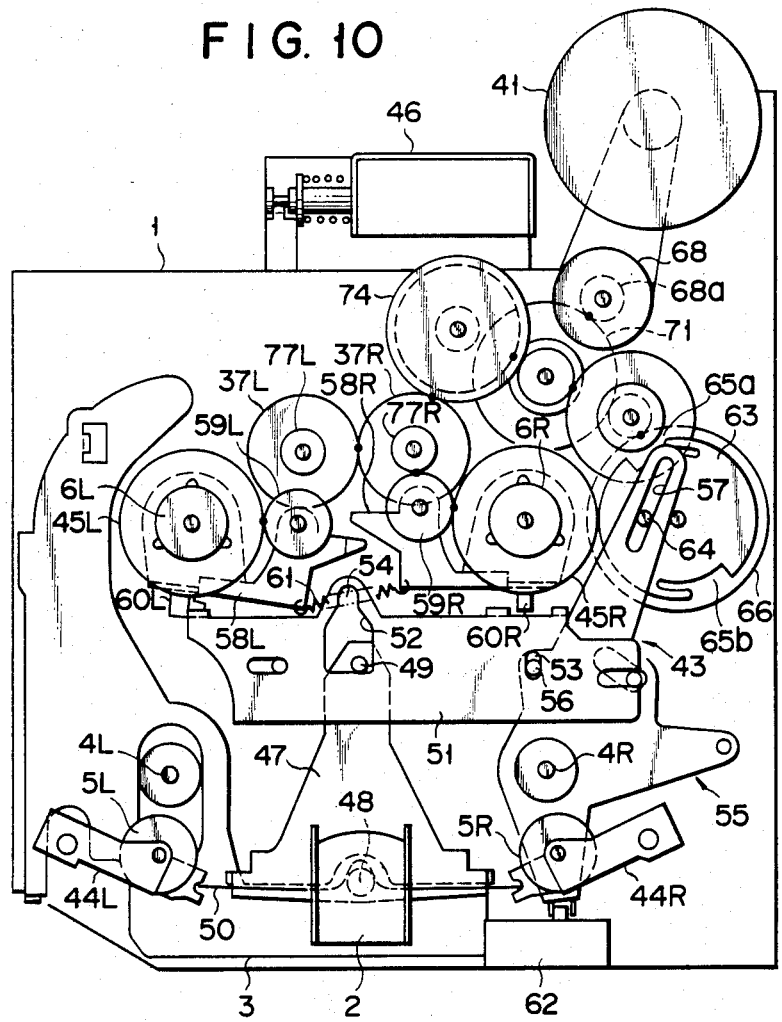

FIG. 10 shows the tape-feed-direction-changing mechanism 43 and its surroundings. The tape-feed-direction-changing mechanism 43 is started by actuating the operating force-transmitting member 31. In FIG. 10, numerals 44L and 44R designate pinch arms, which are rockably mounted on the tape recorder chassis 1. The pinch rollers 5L and 5R are pivotally mounted on the rocking ends of the pinch arms 44L and 44R, respectively.

Steady-feed gears 45L and 45R, larger in diameter than the reel shaft gears 36L and 36R, are mounted on the proximal end portions of the reel shafts 6L and 6R, respectively, so as to be coaxial therewith. In FIG. 10, moreover, numeral 46 designates a solenoid, which holds the head-mounting plate 3 in its advanced position (operating position).

A pinch-roller-changing plate 47 is rockably mounted on the front end portion of the head-mounting plate 3 by means of a pivot 48. A cam pin 49 protrudes from the upper surface of the front end portion of the changing plate 47. The central portion of a bar spring 50 engages the pivot 48. The two end portions of the bar spring 50 engage the left- and right-hand ends of the changing plate 47, and are retained by the rocking ends of the pinch arms 44L and 44R, individually.

In FIG. 10, numeral 51 designates a supply-side-detecting-member retaining plate, which is mounted on the tape recorder chassis 1 so as to be movable in the horizontal direction as illustrated. The retaining plate 51 is provided with a cam hole 52 to receive the cam pin 49 and an engaging slot 53 extending in the vertical direction of FIG. 10. The front edge portions of the cam hole 52 are inclined from both sides toward the front end. The extreme front end of the cam hole 52 defines a recess 54 to engage the cam pin 49.

Numeral 55 designates a changing-rocking plate, rockable around the right-hand capstan 4R. The changing-rocking plate 55 has an engaging pin 56 which protrudes therefrom to be inserted in the engaging slot 53. A radially extending engaging slot 57 is formed at the front end portion of the changing-rocking plate 55.

Numerals 58L and 58R designate rocking plates, which can rock around the central axes of the reel shafts 6L and 6R, respectively. Gears 59L and 59R are pivotally mounted on the rocking plates 58L and 58R, respectively, and are in mesh with the steady-feed gears 45L and 45R, respectively. The rocking plates 58L and 58R have their respective projections 60L and 60R between which a tension spring 61 is stretched, whereby the rocking plates 58L and 58R are kept in position.

Numeral 62 designates a switch for changing the polarity of the magnetic head 2 in accordance with the tape feed direction.

Numeral 63 designates a changing gear from the top of which protrudes an engaging pin 64 to be fitted in the engaging slot 57. Two pause portions 65a and 65b are symmetrically cut in the tooth region of the changing gear 63. A driving gear 66 for reverse operation coaxially underlies the changing gear 63.

Figure 11:
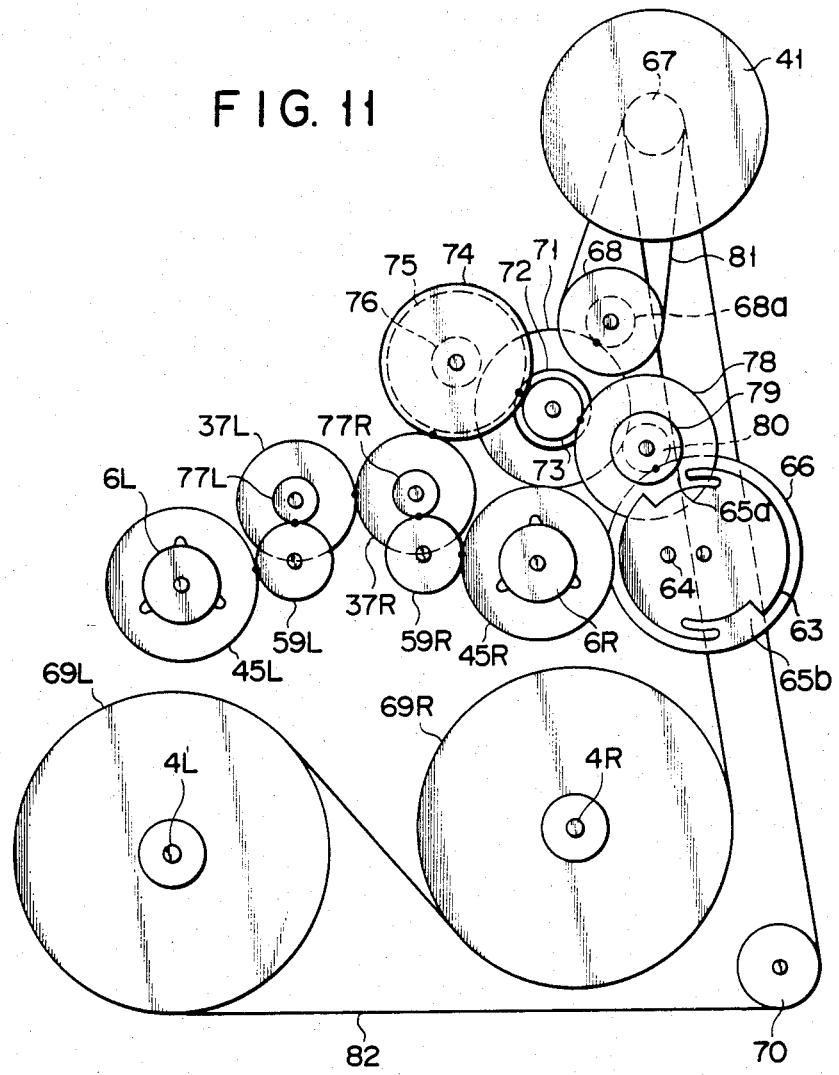

FIG. 11 shows a rotation transmission path through which the driving force of the motor 41 is transmitted to the capstans 4L and 4R and the steady-feed gears 45L and 45R. In FIG. 11, numeral 67 designates a motor pulley, and 68 a driven pulley having a gear 68a integrally formed on the underside thereof and pivotally mounted on the under surface of the tape recorder chassis 1. Numerals 69L and 69R designate flywheels having belt grooves on their peripheries and fixed to the capstans 4L and 4R, respectively, while numeral 70 designates a guide pulley pivotally mounted on the under surface of the tape recorder chassis 1. Numerals 71, 72 and 73 designate integral gears, and 74, 75 and 76 designate independent gears. Small gears 77L and 77R are formed integrally with the transmission gears 37L and 37R. Numerals 78, 79 and 80 also designate integral gears.

The motor pulley 67 and the driven pulley 68 are adapted to rotate in association with each other by means of an endless belt 81. The motor pulley 67, the flywheels 69L and 69R, and the guide pulley 70 are associated for rotation by another endless belt 82 so that the capstans 4L and 4R are rotated in opposite directions.

The rotation of the driven pulley 68 is transmitted to the right-hand reel shaft 6R through the gears 71, 72, 75, 37R, 77R and 59R and the right-hand steady-feed gear 45R. The rotation of the gear 37R is transmitted to the left-hand reel shaft 6L through the gears 37L, 77L and 59L and the left-hand steady-feed gear 45L.

Further, the rotation of the driven pulley 68 is transmitted to the driving gear 66 for reverse operation through the gears 71, 73, 78 and 80.

Figure 12:
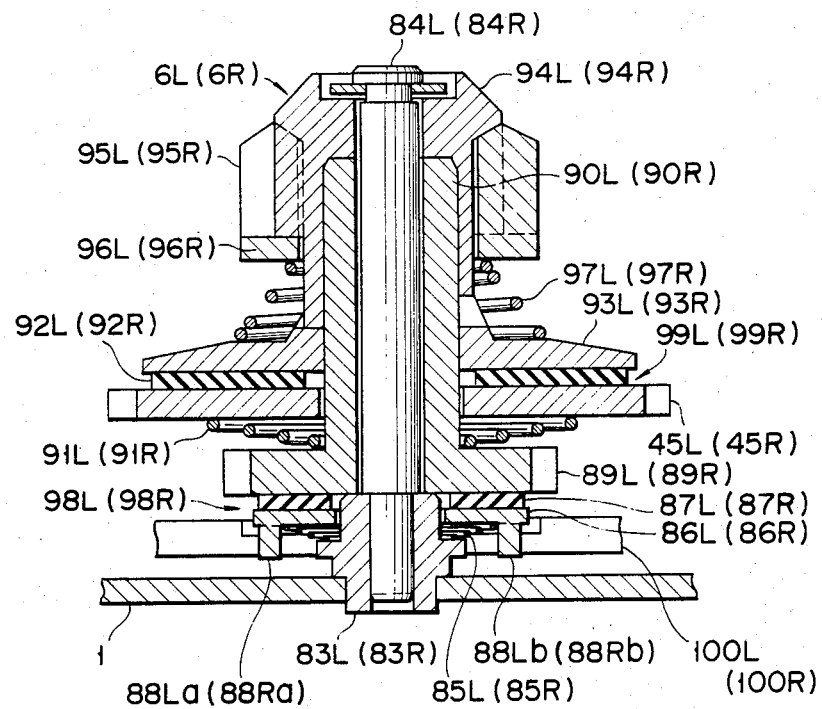

FIG. 12 shows the left-hand reel shaft 6L. The two reel shafts 6L and 6R have the same construction, and components of the right-hand reel shaft 6R are designated by parenthesized numerals accompanying those for their corresponding components of the left-hand reel shaft 6L.

A fixed shaft 84L (84R) is set up on the tape recorder chassis 1 with the aid of a bush 83L (83R). A low-elasticity compression coil spring 85L (85R), a backup plate 86L (86R), and a friction member 87L (87R), formed of felt or another material, are successively fitted on the bush 83L (83R). Two pressure projections 88La (88Ra) and 88Lb (88Rb) protrude from the under surface of the backup plate 86L (86R). A fast-feed gear 89L (89R) is fitted on the fixed shaft 84L (84R). The fast-feed gear 89L (89R) has a sleeve portion 90L (90R) on its upper surface side. A high-elasticity compression coil spring 91L (91R), the steady-feed gear 45L (45R), and a friction member 92L (92R), formed of felt or another material, are successively fitted on the sleeve portion 90L (90R). A reel bearing plate 93L (93R) and a cylindrical reel support 94L (94R) are fitted tight on the outer peripheral surface of the sleeve portion 90L (90R). An engaging ring 96L (96R) having an engaging portion 95L (95R), to engage a reel hub (not shown) of the tape cassette 7 in the rotating direction, is fitted on the outer peripheral surface of the reel support 94L (94R) for vertical motion. A compression coil spring 97L (97R) is interposed between the engaging ring 96L (96R) and the reel bearing plate 93L (93R). The upward displacement of the engaging ring 96L (96R) is restricted by the reel support 94L (94R).

The compression coil spring 85L (85R), the backup plate 86L (86R), the friction member 87L (87R), and the fast-feed gear 89L (89R) constitute a friction mechanism 98L (98R) for reverse operation. The compression coil spring 91L (91R), the steady-feed gear 45L (45R), the friction member 92L (92R), and the reel bearing plate 93L (93R) constitute a friction mechanism 99L (99R) for the tape winding operation.

A rotation-detecting member 100L (100R) is disposed beside the reel shaft 6L (6R).

Figure 13:
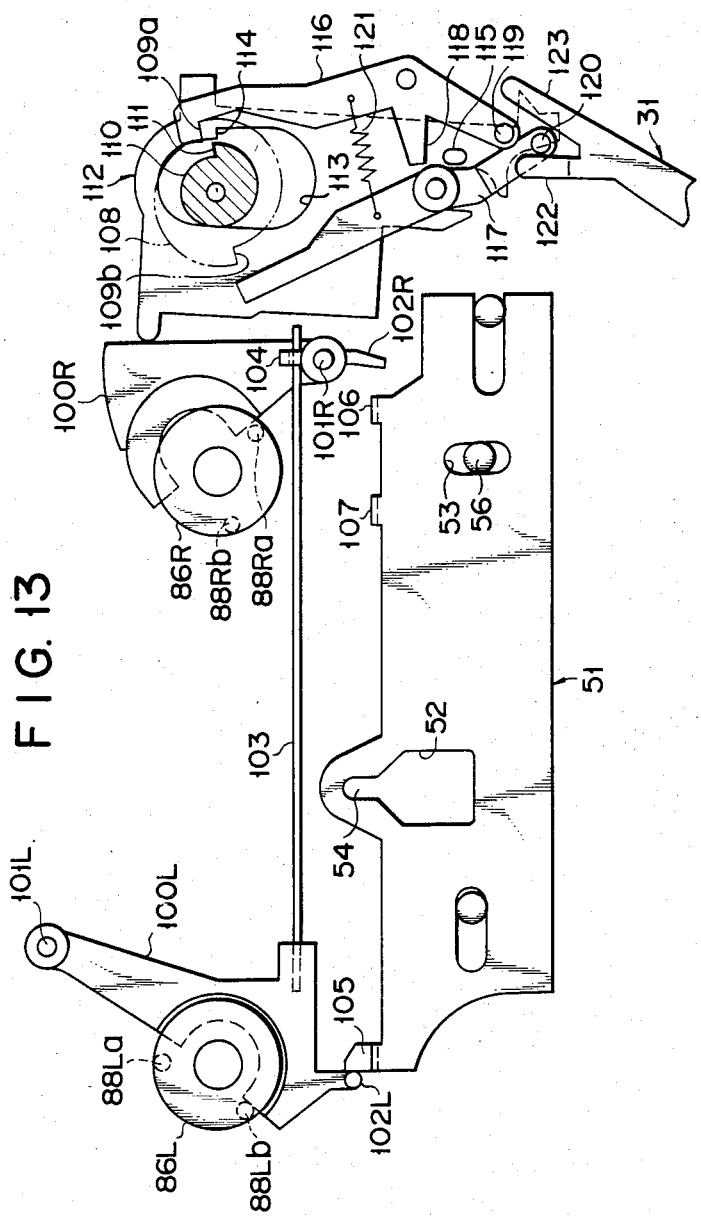

As shown in FIG. 13, the rotation-detecting members 100L and 100R are rockably mounted on shafts 101L and 101R, respectively, fixed on the upper surface of the tape recorder chassis 1. Part of each rotation-detecting member 100L or 100R is located under its corresponding backup plate 86L or 86R. The left-hand rotation-detecting member 100L has an abutting portion 102L at its extreme end on the same side with the backup plate 86L with respect to a shaft 101L, and is rigidly fitted with one end of a pressure rod 103. The right-hand rotation-detecting portion 100R has an abutting member 102R on the opposite side of a shaft 101R to the backup plate 86R. The right-hand rotation-detecting member 100R also has a guide portion 104 through which the other end of the pressure rod 103 is passed. When the backup plates 86L and 86R rotate clockwise, the pressure projection 88La of the left-hand backup plate 86L causes the left-hand rotation-detecting member 100L to rock to the right, and the pressure projection 88Rb of the right-hand backup plate 86R presses the right-hand rotation-detecting member 100R to rock it to the right. When the backup plates 86L and 86R rotate counterclockwise, on the other hand, the pressure projection 88Lb of the left-hand backup plate 86L presses the left-hand detecting member 100L to rock it to the right, and the pressure projection 88Ra of the right-hand backup plate 86R presses the right-hand detecting member 100R to rock it to the right. Thus, an urging force to rock the rotation-detecting members 100L and 100R to the right will be produced if the backup plates 86L and 86R rotate in either direction. Naturally, the rotatory force of the backup plates 86L and 86R is produced by the rotation of the reel shafts 6L and 6R.

As shown in FIG. 13, left- and right-hand pressure pieces 105 and 106 and another pressure piece 107 beside the right-hand pressure piece 106 are formed on the front edge of the supply-side-detecting-member retaining plate 51. When the retaining plate 51 is at its left-hand motion limit, its left-hand pressure piece 105 prevents the abutting portion 102L from moving to the right. When the retaining plate 51 is at its right-hand motion limit, its right-hand pressure piece 106 prevents the abutting portion 102R from moving to the left.

Figure 14:
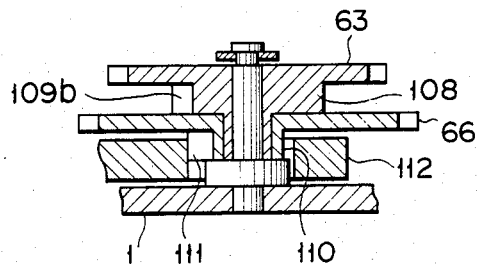
Figure 15:
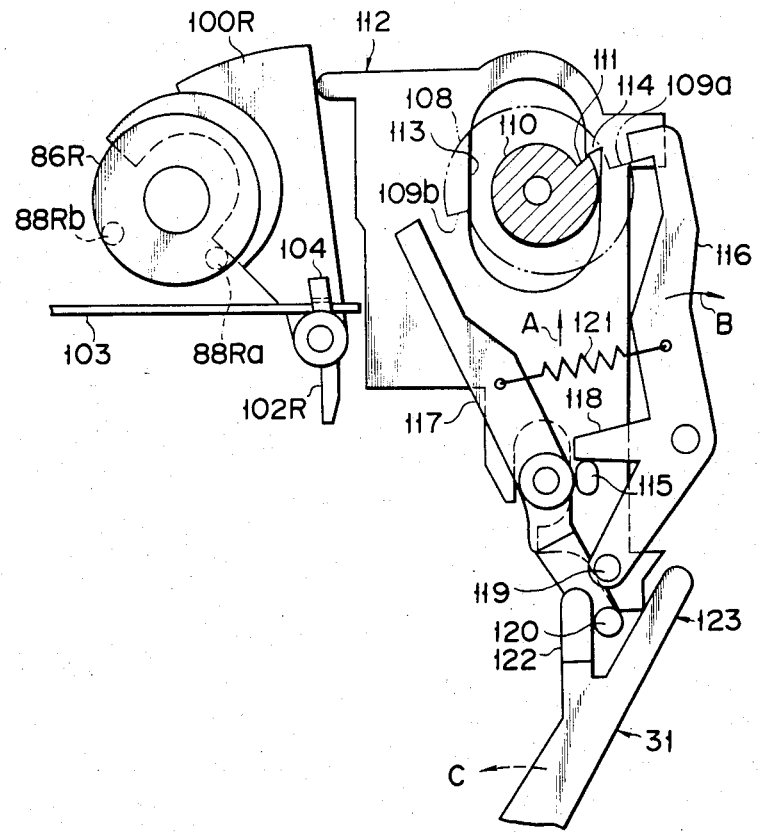

As shown in FIGS. 14 and 15, a rotating claw 108 is formed integrally on the lower surface of the changing gear 63. The rotating claw 108 is symmetrical with respect to its axis of rotation, and has two retaining step portions 109a and 109b arranged symmetrically. A rotating cam 110 is formed integrally on the lower surface of the reverse-operation driving gear 66. The rotating cam 110 has a volute cam surface on its outer periphery so that a retaining step portion 111 is defined between maximum- and minimum-radius portions.

In FIGS. 14 and 15, numeral 112 designates a plastic swinging plate which has an opening 113 to receive the rotating cam 110 and a pressure projection 115 on its upper surface. An engaging portion 114 is formed on the right-side edge of the opening 113. The swinging plate 112 is located on the right of the rotation-detecting member 100R and the pressure rod 103.

As shown in FIGS. 13 and 15, moreover, two retaining levers 116 and 117 are rockably disposed beside the changing gear 63. A retaining claw at the distal end of the one retaining lever 116 engages the retaining step portion 109a or 109b on the outer periphery of the rotating claw 108 (the one retaining step portion 109a is engaged in FIG. 13). In this state, one of the pause portions 65a and 65b of the changing gear 63 faces the gear 79 (see FIGS. 10, 11 and 16). A pressure-receiving piece 118 and an engaging projection 119 are formed on the one retaining lever 116. The pressure-receiving piece 118 is located just in front of the pressure projection 115 of the swinging plate 112. One end of the other retaining lever 117 faces the outer periphery of the rotating claw 108 from the opposite side thereof to the one retaining lever 116. An engaging projection 120 is formed on the other end of the retaining lever 117. A tension spring 121 is stretched between the two retaining levers 116 and 117, whereby the retaining levers 116 and 117 are urged to come into contact with the rotating claw 108. As shown in FIG. 13, the operating force-transmitting member 31 is provided with a bifurcate combination of two pressure pieces 122 and 123. The one pressure piece 122 abuts against the engaging projection 120 of the retaining lever 117 so that the retaining lever 117 is kept away from the rotating claw 108.

Thereupon, the left- and right-hand rotation-detecting members 100L and 100R directly apply a rightward urging force to the swinging plate 112 by means of the pressure rod 103.

While the reel shafts 6L and 6R are rotating, the urging force from the rotation-detecting member 100L or 100R on the take-up side acts on the swinging plate 112 to press the left side edge of the opening 113 against the outer periphery of the rotating cam 110. Meanwhile, the rotation-detecting member 100R or 100L on the supply side is prevented from rocking to the right by the supply-side-detecting-member retaining plate 51. Thus, the rotatory force of the reel shaft 6R or 6L on the supply side has no influence on the swinging plate 112. Since the coefficient of elasticity of the compression coil springs 85L and 85R used in the reverse-operation friction mechanisms 98L and 98R is low, the transmitting force of the reverse-operation friction mechanisms 98L and 98R is small. Therefore, the force of the rotation-detecting mechanism 100L or 100R on the take-up side, which is produced by the transmitting force of the friction mechanism 98L or 98R, to press the swinging plate 112 is very small.

While the swinging plate 112 is subjected to the rightward urging force, the outer periphery of the rotating cam 110 is in sliding contact with the left side edge of the opening 113 so that the swinging plate 112 swings from side to side to avoid engagement between its engaging portion 114 and the retaining step portion 111 of the rotating cam 110. When the reel shafts 6L and 6R stop and cause the urging force to be removed from the swinging plate 112, the swinging plate 112 is retained at its left-hand motion limit by the maximum-radius portion of the rotating cam 110. As a result, the retaining step portion 111 engages the engaging portion 114 of the swinging plate 112, as shown in FIG. 15, so that the swinging plate 112 is moved in the direction of arrow A by the rotatory force of the rotating cam 110. Accordingly, the pressure projection 115 of the swinging plate 112 presses the pressure receiving piece 118 of the retaining lever 116 to rock the retaining lever 116 in the direction of arrow B. Thus, the retaining lever 116 is disengaged from the retaining step portion 109a (or 109b) of the changing gear 63, releasing the changing gear 63 from retention.

Figure 16:
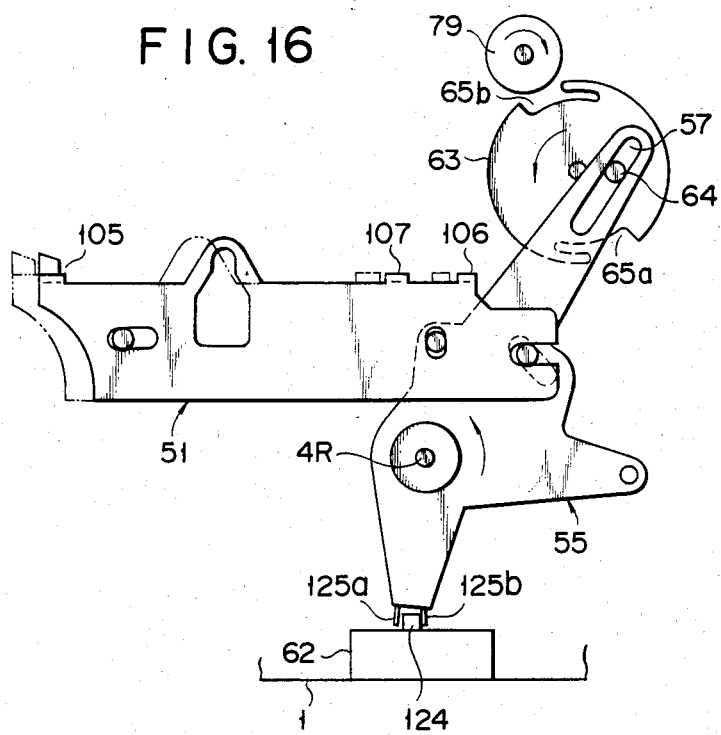

As shown in FIG. 16, the changing rocking plate 55 has two elastic members 125a and 125b between which is held a movable changing piece 124 of the switch 62 for polarity inversion. Every time the changing gear 63 makes a half turn, the movable changing piece 124 is shifted by the elastic member 125a or 125b. The excessive amount of rotation of the rocking plate 55 is absorbed by elastic deformation of the elastic member 125a or 125b. At the same time, the restoring force of the elastically deformed elastic member 125a or 125b acts on the rocking plate 55 so that the rocking plate 55 causes the changing gear 63 to rotate in the counterclockwise direction of FIG. 16.

Accordingly, if the retaining lever 116 is disengaged from the retaining step portion 109a (or 109b) of the rotating claw 108, as shown in FIG. 15, the changing gear 63 is slightly rotated counterclockwise by the restoring force of the elastic member 125a (or 125b). As a result, the changing gear 63 meshes with the normally rotating gear 79 to be rotated thereby.

When the changing gear 63 makes a half turn, the retaining lever 116 engages the retaining step portion 109b (or 109a) on the opposite side to be prevented again from rotating. In the meantime, the changing rocking plate 55 is reversed as the engaging pin 64 engages the engaging slot 57. As the changing rocking plate 55 is reversed, the switch 62 is shifted, and the supply-side-detecting-member retaining plate 51 moves to the left or right with the engagement between the engaging slot 53 and the engaging pin 56.

Figure 17:
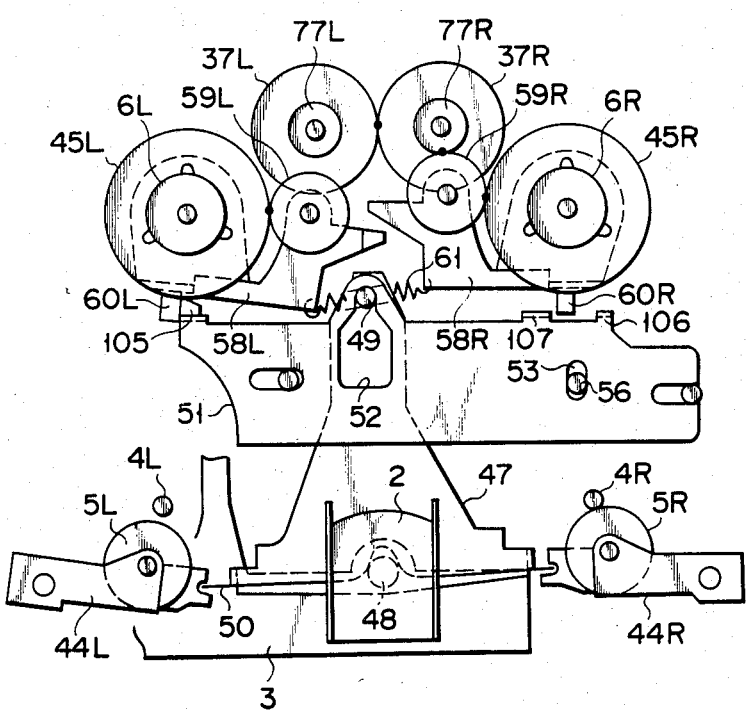
Figure 18:
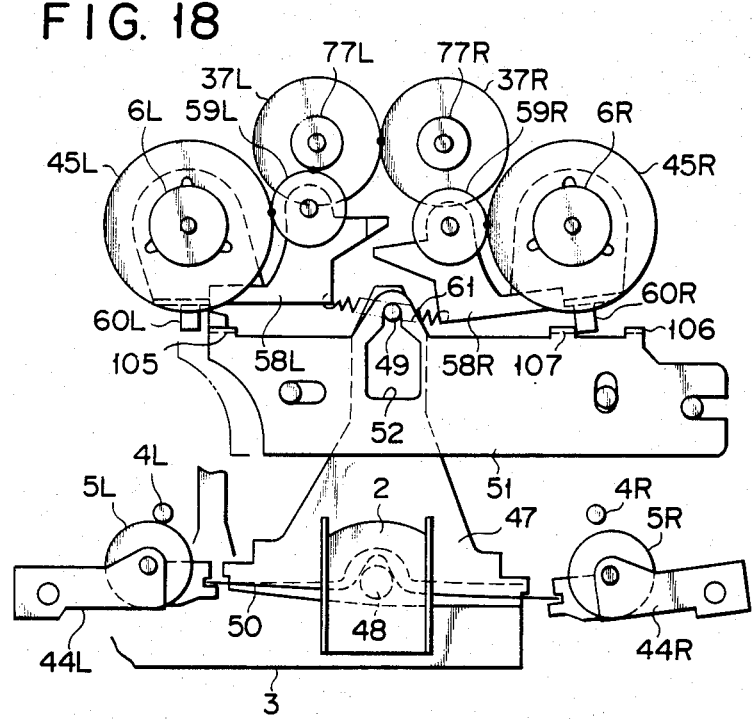

FIGS. 17 and 18 show the relative positions of the supply-side-detecting-member retaining plate 51 and the peripheral mechanisms surrounding the same in a state such that the head mounting plate 3 is in its advanced position (operating position). When the head mounting plate 3 is thus in the advanced position, the cam pin 49 of the pinch-roller-changing plate 47 is fitted in the recess 54 at the front end of the cam hole 52 in the retaining plate 51.

In FIG. 17, the retaining plate 51 is at its left-hand motion limit. In this state, the pressure piece 105 of the retaining plate 51 presses the projection 60L of the left-hand rocking plate 58 to the left, thereby separating the gear 59L from the gear 77L. As mentioned before, moreover, the pressure piece 105 prevents the left-hand rotation-detecting member 100L from rocking to the right (see FIG. 13), thereby disconnecting the detecting member 100L from the swinging plate 112. Also, the pinch-roller-changing plate 47 is inclined to the left so that the left-hand pinch roller 5L is separated from the capstan 4L at the left end of the bar spring 50, and at the same time, the right-hand pinch roller 5R is pressed against the capstan 4R at the right end of the bar spring 50. Accordingly, the rotary force of the motor 41 is transmitted to the right-hand reel shaft 6R, and the tape is fed to the right in FIG. 17 to be held between the capstan 4R and the pinch roller 5R on the right-hand side. Thus, the tape is wound on a right-hand reel in the tape cassette 7.

In FIG. 18, on the other hand, the retaining plate 51 is at its right-hand motion limit. In this state, the pressure piece 107 of the retaining plate 51 presses the projection 60R of the right-hand rocking plate 59 to the right, thereby separating the gear 59R from the gear 77R. As mentioned before, moreover, the pressure piece 106 prevents the right-hand rotation-detecting member 100R from rocking to the right, thereby disconnecting the detecting member 100R from the swinging plate 112. Also, the pinch-roller-changing plate 47 is inclined to the right so that the right-hand pinch roller 5R is separated from the capstan 4R at the right end of the bar spring 50, and the left-hand pinch roller 5L is pressed against the capstan 4L at the left end of the bar spring 50. Accordingly, the rotary force of the motor 41 is transmitted to the left-hand reel shaft 6L, and the tape is fed to the left of FIG. 18 to be held between the capstan 4L and the pinch roller 5L on the left-hand side. Thus, the tape is wound on a left-hand reel in the tape cassette 7.

Figure 20:
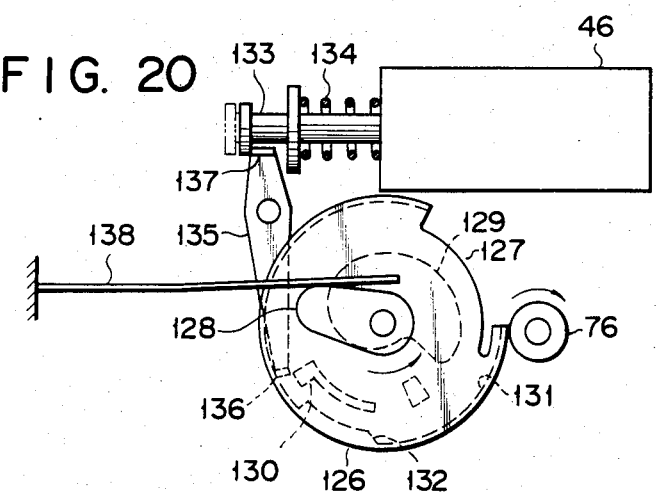
Figure 19:
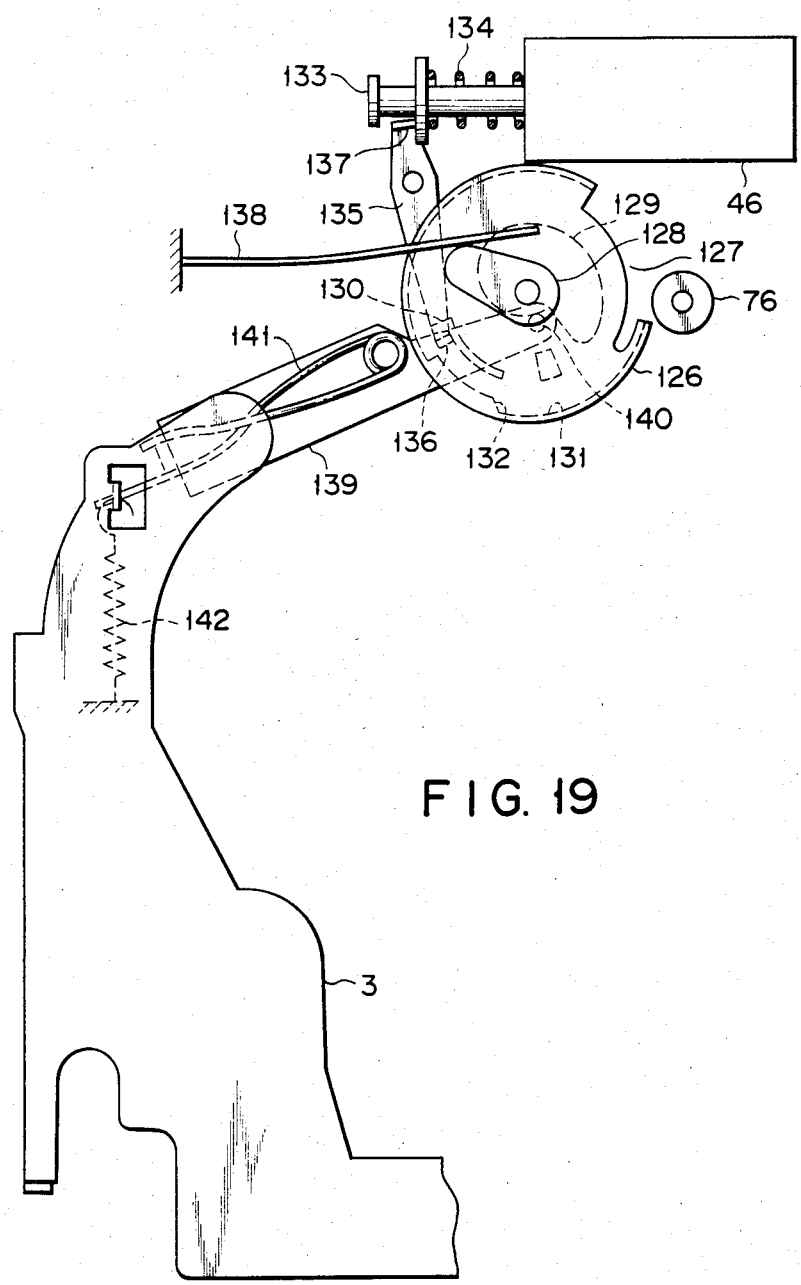
Figure 21:
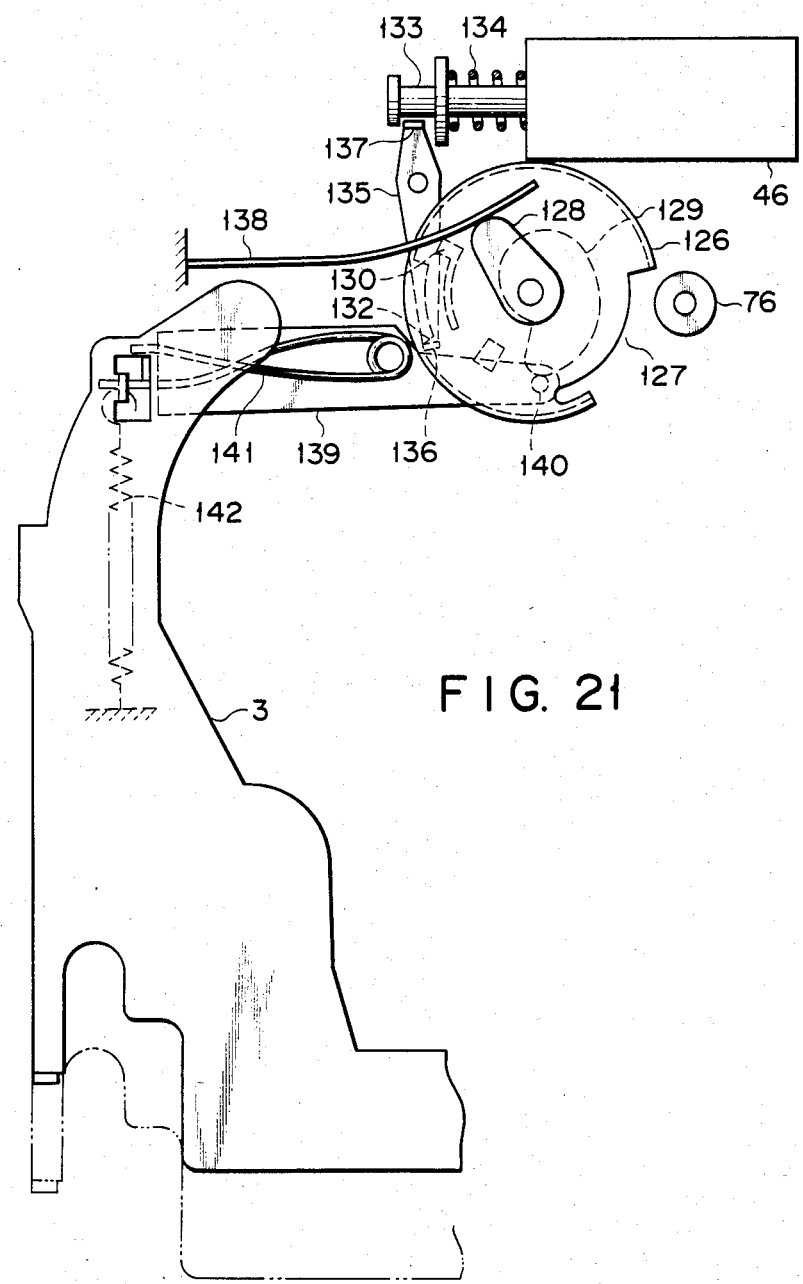

FIGS. 19 to 21 show a mechanism for moving the head mounting plate 3 from its retreated position (stop position) to an advanced position (operating position).

In the vicinity of the gear 76, a driving gear 126 is mounted on the back side of the tape recorder chassis 1. Part of the tooth region of the driving gear 126 is cut to form a pause portion 127. The driving gear 126 has a spring bearing projection 128 on the upper surface side and a volute rotating cam 129 and a stop-mode retaining portion 130 on the lower surface side. A stopper wall 131 protrudes from the peripheral edge portion of the lower surface of the driving gear 126. Further, an operating-mode retaining portion 132 projects beside the stop-mode retaining portion 130.

Meanwhile, a plunger 133 of the solenoid 46 is continually urged toward its stretched position by a coil spring 134. When the tape cassette 7 is inserted to energize a solenoid coil of the solenoid 46, the plunger 133 is drawn into the solenoid coil.

In FIGS. 19 to 21, numeral 135 designates a retaining lever, the ends of which form a cam-engaging portion 136 and a plunger-engaging portion 137, respectively. The plunger-engaging portion 137 is adapted to engage the distal end portion of the plunger 133 of the solenoid 46, while the cam engaging portion 136 is held against the lower surface of the rotating cam 129. Numeral 138 designates a leaf spring (or bar spring) which presses its free end against the spring-bearing projection 128, thereby applying a counterclockwise rotatory force to the driving gear 126.

Numeral 139 designates a cam lever which is rockably mounted on the back side of the tape recorder chassis 1. A cam follower 140 to be in sliding contact with the cam surface of the rotating cam 129 is formed at one end of the cam lever 139. The cam lever 139 is fitted with a bar spring 141 with a high coefficient of elasticity. The distal end of the bar spring 141 engages part of the head mounting plate 3. Numeral 142 designates a tension spring for restoring the head-mounting plate 3 from the operating position to the stop position. The elastic force of the tension spring 142 presses the cam follower 140 against the cam surface of the rotating cam 129.

In the stop mode, as shown in FIG. 19, the cam engaging portion 136 of the retaining lever 135 engages the stop-mode retaining portion 130, thereby causing the pause portion 127 to face the gear 76. The elastic force of the leaf spring 138 acts on the spring-bearing projection 128, urging the driving gear 126 to rotate in the counterclockwise direction of FIG. 19. The cam follower 140 is located on the minimum-radius portion of the cam surface of the rotating cam 129 so that the head mounting plate 3 is held in the retreated position (stop position, see FIG. 10) by the tension spring 142.

When the tape cassette 7 is inserted in this state, the solenoid 46 is energized. As the plunger 133 is actuated, the retaining lever 135 rocks to have its cam-engaging portion 136 disengaged from the stop-mode retaining portion 130. As a result, the driving gear 126 is slightly rotated by the leaf spring 138 to mesh with the gear 76.

Accordingly, the rotatory force of the gear 76, i.e., the driving force of the motor 41, is then transmitted to the driving gear 126, which almost makes one counterclockwise revolution. In the meantime, the cam follower 140 moves to the maximum-radius portion of the cam surface of the rotating cam 129, and the cam lever 139 makes a substantial rocking to move the head-mounting plate 3 against the urging force of the tension spring 142 to the operating position (see FIG. 21). At this time, the cam-engaging portion 136 engages the operating-mode retaining portion 132 to stop the driving gear 126. Thereupon, the pause portion 127 faces the gear 76 again, and the leaf spring 138 is pressed against the spring-bearing projection 128 to apply a counterclockwise rotatory force to the driving gear 126.

The stop mode is established by stopping the current supply to the solenoid 46. The moment the current supply is stopped, the plunger 133 returns to the stretched position, so the cam engaging portion 136 of the retaining lever 135 is disengaged from the operating-mode retaining portion 132, allowing the driving gear 126 to be slightly rotated by the leaf spring 138. As a result, the cam follower 140 falls onto the minimum-radius portion of the cam surface of the rotating cam 129, so the head-mounting plate 3 is restored to the stop position by the return spring 142.

The tape recorder of this embodiment is further provided with a mechanism (not shown) for rocking the rocking plates 58L and 58R in association with the retreating action of the head mounting plate 3 to separate the gears 59L and 59R from the gears 77L and 77R, respectively. Thus, the moment the head-mounting plate 3 is restored to the stop position, the rotatory force-transmission path from the motor 41 to the reel shafts 6L and 6R is disconnected.

In the arrangement described above, if the first operating member 8 is moved against the urging force of the tension spring 18, then the tape can be quickly fed leftward during recording or reproducing operation. Namely, by moving the first operating member 8, its speed-changing, piece-pressing portion 19 is caused to press one end of the speed-changing piece 16, thereby rocking the piece 16 in the counterclockwise direction. As a result, the reciprocative sliding member 32 in engagement with the speed-changing piece 16 moves in the same direction with the first operating member 8, thereby rocking the tape-speed-changing lever 34 counterclockwise. Then, one end of the bar spring 35 causes the left-hand idler arm 38L to rock to the left, thereby causing the left-hand idler gear 39L to mesh with the left-hand reel shaft gear 36L. Thus, the driving force of the motor 41 is transmitted to the left-hand reel shaft 6L. In consequence, the left-hand reel shaft 6L is rotated at high speed in its tape winding direction, so the tape is quickly fed leftward.

In order to quickly feed the tape rightward, it is necessary only that the second operating member 9 be moved against the urging force of the tension spring 23. In this case, the speed-changing, piece-pressing portion 24 of the second operating member 9 presses the other end of the speed-changing piece 16. Accordingly, the speed-changing piece 16 rocks clockwise, so that the reciprocative sliding member 32 moves in the direction (returning direction) opposite to the moving direction of the second operating member 9. As a result, the tape-speed-changing lever 34 rocks in the clockwise direction, causing the right-hand idler arm 38R to the right through the medium of the bar spring 35. Thus, the right-hand idler gear 39R meshes with the right-hand reel shaft gear 36R so that the driving force of the motor 41 is transmitted to the right-hand reel shaft 6R for the rightward fast feed of the tape.

In either case, if the operating force is removed from the operating member 8 or 9, the operating member 8 or 9 is restored by the tension spring 18 or 23 so that the idler arm 38L or 38R is restored to its original position for a recording or reproducing operation.

During the fast-feed operation, it is necessary that the magnetic head 2 be kept away from the magnetic tape or that the contact pressure between the magnetic head 2 and the magnetic tape be lowered. At the same time, both the pinch rollers 5L and 5R need to be kept apart from the capstans 4L and 4R, respectively. This situation may be obtained by retreating the head mounting plate 3 through the movement of the operating member 8 or 9 and also retreating the pinch roller 5L or 5R in contact with the capstan 4L or 4R in association with the head-mounting plate 3. The means for achieving this purpose is well-known in the art and will not, therefore, be described in detail.

Figure 8:
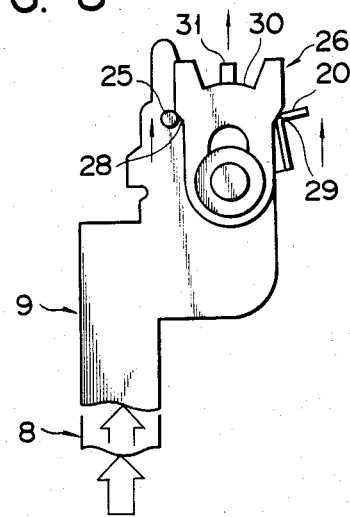

The tape-feed direction may be changed during the recording or reproducing operation by simultaneously shifting the first and second operating members 8 and 9. In this case, as described before in connection with FIG. 8, the tape-direction-changing piece 26 moves forward to shift the operating force-transmitting member 31. Thereupon, the operating force-transmitting member 31 rocks in the direction indicated by arrow C in FIG. 15 to disengage the one pressure piece 122 thereof from the engaging projection 120, thereby bringing the distal end of the retaining lever 117 into contact with the outer periphery of the rotating claw 108. At the same time, the other pressure piece 123 of the operating force-transmitting member 31 presses the engaging projection 119 to rock the retaining lever 116 in the direction indicated by arrow B in FIG. 15. As a result, the changing gear 63 is released from retention by the retaining lever 116 to mesh with the gear 76. Thus, the changing gear 63 is supplied with the driving force of the motor 41 to move the supply-side-detecting-member retaining plate 51 from right to left or from left to right, thereby changing the tape-feed direction.

In changing the tape-feed direction, if the respective speed-changing, piece-pressing portions 19 and 24 of the two operating members 8 and 9 press their corresponding ends of the speed-changing piece 16 at the same time, both of the operating members 8 and 9 will possibly be prevented from moving. Such an awkward situation may, however, be avoided by setting a proper play or allowance for the engagement between the speed-changing piece 16 and the pressing portions 19 and 24 so that the tape-direction-changing piece 26 can move during a time lag corresponding to the play.

According to the present embodiment, as described above, three operations, including leftward fast feed, rightward fast feed, and tape-feed-direction change, can be performed selectively with use of the first and second operating members 8 and 9 only. Thus, the tape recorder according to this embodiment is simplified in construction and hence reduced in size, facilitating the assembling work.

What is claimed is:

1. A tape recorder apparatus having a housing to which are mounted a magnetic head, two spaced reel shafts, means to engage said magnetic head with magnetic tape, means to drive said magnetic tape as it is engaged with said magnetic head to recore/reproduce signals, means to drive said magnetic tape at high speed, and means for changing tape feed direction, said apparatus comprising:

first operating member means mounted to said housing and selectively manually movable for reciprocating relative to said housing between its rest position and an actuating point along a given line to actuate said high speed tape driving means for one reel shaft when it reaches said actuating point;

second operating member means mounted to said housing and selectively manually movable for reciprocating relative to said housing between its rest position and an actuating point along a line parallel to said given line to actuate said high speed tape driving means for another reel shaft when it reaches said actuating point;

resilient means to bias said first and second operating member means away from said actuating point and toward said rest position;

a tape-direction changing piece mounted to said housing for pivotal and linear movement relative thereto, said first operating member means pivoting said piece, exclusive of said second operating member means, in one direction of rotation when it advances along said given line to the actuating point, said second operating member means pivoting said piece, exclusive of said first operating member means, in the other direction of rotation when it advances along said parallel line to said actuating point, said first and second operating member means when moved together to an intermediate point between the rest position and said actuating point causing said piece to linearly move parallel to said given line to actuate said means for changing tape feed direction.

2. The tape recorder apparatus according to claim 1, wherein said first and second operating member means and said tape-direction-changing piece are arranged one above the other.

3. The tape recorder apparatus according to claim 1, wherein said means for changing tape feed direction includes a driving gear supplied with a rotary force from a reel driving motor, a changing gear having two pause portions cut in the tooth region thereof so as to be symmetrical with respect to the center of rotation thereof, one of the pause portions retaining the changing gear in a position facing the driving gear, retaining means for releasing the changing gear from retention to cause the same to mesh with the driving gear when the means for changing tape feed direction moves together with the first and second operating member means, and means for changing the tape-feed direction by rotating the changing gear to shift relative positions of two pinch rollers and their corresponding capstans for engagement or disengagement.

* * * * *